United States Patent
Kabra et al.

(10) Patent No.: US 11,232,037 B2
(45) Date of Patent: Jan. 25, 2022

(54) USING A FIRST-IN-FIRST-OUT (FIFO) WRAPAROUND ADDRESS LOOKUP TABLE (ALT) TO MANAGE CACHED DATA

(71) Applicant: Seagate Technology LLC, Cupertino, CA (US)

(72) Inventors: Nitin Satishchandra Kabra, Pune (IN); Sidheshkumar Ramanlal Patel, Pune (IN); Sneha Kishor Wagh, Pune (IN)

(73) Assignee: Seagate Technology LLC, Cupertino, CA (US)

( * ) Notice: Subject to any disclaimer, the term of this patent is extended or adjusted under 35 U.S.C. 154(b) by 585 days.

(21) Appl. No.: 15/790,297

(22) Filed: Oct. 23, 2017

(65) Prior Publication Data

US 2019/0121740 A1    Apr. 25, 2019

(51) Int. Cl.

| | |
|---|---|
| *G06F 12/0868* | (2016.01) |
| *G06F 3/06* | (2006.01) |
| *G06F 12/02* | (2006.01) |
| *G06F 12/0873* | (2016.01) |
| *G06F 12/1027* | (2016.01) |

(52) U.S. Cl.
CPC .......... *G06F 12/0868* (2013.01); *G06F 3/061* (2013.01); *G06F 3/0659* (2013.01); *G06F 3/0679* (2013.01); *G06F 12/0246* (2013.01); *G06F 12/0873* (2013.01); *G06F 12/1027* (2013.01); *G06F 2212/303* (2013.01); *G06F 2212/313* (2013.01); *G06F 2212/7201* (2013.01)

(58) Field of Classification Search
CPC ........... G06F 3/0659; G06F 2212/7201; G06F 12/0868; G06F 12/1027
See application file for complete search history.

(56) References Cited

U.S. PATENT DOCUMENTS

| | | | |
|---|---|---|---|
| 5,717,954 | A | 2/1998 | Grieff et al. |
| 7,143,227 | B2 | 11/2006 | Maine |

(Continued)

OTHER PUBLICATIONS

NVM Express Revision 1.1, Oct. 11, 2012, Intel, Revision 1.1, pp. 1-163 (Year: 2012).*

(Continued)

*Primary Examiner* — Reginald G Bragdon
*Assistant Examiner* — Curtis James Kortman
(74) *Attorney, Agent, or Firm* — Hall Estill Law Firm

(57) ABSTRACT

A cache management mechanism is provided having a size that is independent of an overall storage capacity of a non-volatile memory (NVM). The cache management mechanism includes a first level map data structure arranged as a first-in-first-out (FIFO) buffer to list a plurality of host access commands sequentially received from a host device. Each command has an associated host tag value. A cache memory stores user data blocks associated with the commands. A second level map of the cache management mechanism correlates cache addresses with the host tag values. A processing core searches the FIFO buffer in an effort to match a logical address of an existing command to the logical address for a new command. If a match is found, the host tag value is used to locate the cache address for the requested data. If a cache miss occurs, the new command is forwarded to the NVM.

20 Claims, 6 Drawing Sheets

(56) References Cited

U.S. PATENT DOCUMENTS

| | | | | |
|---|---|---|---|---|
| 7,844,758 | B1* | 11/2010 | Hughes | G06F 9/52 |
| | | | | 710/33 |
| 8,688,899 | B2 | 4/2014 | Nellans et al. | |
| 9,696,941 | B1* | 7/2017 | Choi | G06F 3/0656 |
| 2010/0165690 | A1* | 7/2010 | Gupta | G11C 15/04 |
| | | | | 365/49.11 |
| 2010/0198936 | A1 | 8/2010 | Burchard et al. | |
| 2011/0055439 | A1 | 3/2011 | Chen et al. | |
| 2016/0048454 | A1* | 2/2016 | Ahmad | G06F 12/1063 |
| | | | | 711/207 |
| 2016/0328347 | A1* | 11/2016 | Worley | G06F 13/385 |
| 2017/0068456 | A1* | 3/2017 | Toge | G06F 3/0605 |

OTHER PUBLICATIONS

"Understanding Flash: The Flash Transition Layer", Oct. 10, 2014, flashdba.com, pp. 1-4 of the provided copy http://web.archive.org/web/20141010153033/https://flashdba.com/2014/09/17/understanding-flash-the-flash-translation-layer/ (Year: 2014).*

* cited by examiner

HARD DISC DRIVE (HDD)

SOLID STATE DRIVE (SSD)

USING A FIRST-IN-FIRST-OUT (FIFO) WRAPAROUND ADDRESS LOOKUP TABLE (ALT) TO MANAGE CACHED DATA

SUMMARY

Various embodiments of the present disclosure are generally directed to data management in a data storage device.

In some embodiments, a data storage device stores host data in a non-volatile memory (NVM). A first level map data structure is arranged as a first-in-first-out (FIFO) wraparound address lookup table (ALT), or FIFO buffer, to list a plurality of host access commands in an order corresponding to an order in which the host access commands were received from a host device. Each command has an associated host tag value. A cache memory stores user data blocks associated with the commands, and a second level map correlates cache addresses with the host tag values. A processing core searches the FIFO buffer in an effort to match a logical address of an existing command to the logical address for a new command. If a match is found, the host tag value is used to locate the cache address for the requested data.

These and other features and aspects of various embodiments of the present disclosure can be understood upon a review of the following detailed description in conjunction with the associated drawings.

DETAILED DESCRIPTION

Figure 1:
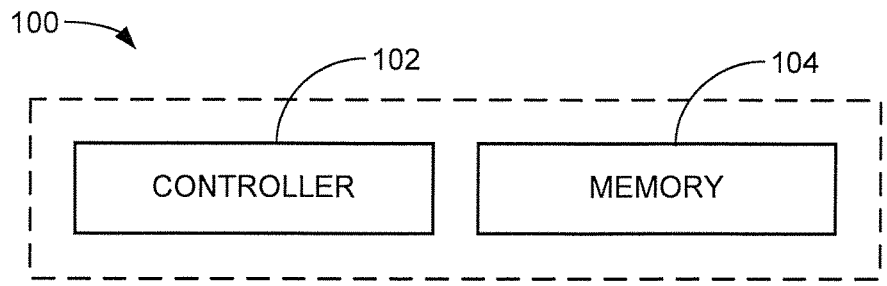
FIG. 1 is a block diagram for a data storage device constructed and operated in accordance with various embodiments of the present disclosure.

The present disclosure generally relates to data storage systems, and more particularly to the management of cache data using a map structure realized in a first-in-first-out (FIFO) wraparound buffer.

Data storage devices operate to store and retrieve computerized user data in a fast and efficient manner. Data storage devices can utilize a variety of different types of storage media to provide a non-volatile memory (NVM) storage space for a host device. Data storage devices may also use cache memory, such as a local volatile memory, to temporarily store copies of user data during data transfer operations with the NVM.

Map structures are often used by data storage devices to track the physical locations of user data stored in the NVM and the cache. Such map structures generally associate logical addresses for data blocks received from a host with physical addresses of the memory in which the data blocks are stored. Factors that can impact the complexity of a map structure include the overall data storage capacity of the NVM, the number of different memory locations or levels tracked by the map structure, the type of memory (e.g., erasable versus rewritable), etc.

It is not feasible in most cases to maintain a complete copy of a memory map structure in a local memory of a data storage device. For example, an NVM comprising 1 terabyte, TB ($10^{12}$ bytes) of HDD magnetic recording disc space with a data block size of 1024 bytes could require upwards of around 1 gigabyte, GB ($10^9$ bytes) of map data to fully describe the NVM. Providing a data storage device with this much (or more) local volatile memory (e.g., DRAM, SRAM, etc.) would be economically and operationally expensive.

To address this, multi-level map structures and map page swapping techniques are often used as part of the map management process. This allows the storage device to maintain an accurate and complete copy of the map structure in the NVM, and to load portions of the map structure to one or more local memories on an as-needed basis. In such a scheme, processing a given host access command can require a first set of data access operations to locate and load the necessary map information to the local memory, followed by a second set of data access operations to retrieve or write the data associated with the command from or to the NVM.

It follows that map management consumes significant processing resources of a data storage device, providing an operational bottleneck that can potentially degrade data I/O throughput performance capabilities of a storage device. This problem gets worse as succeeding generations of storage devices are provided with ever higher amounts of storage capacity and/or hierarchical levels of storage, since these and other factors directly increase the complexity and size of the mapping system.

Accordingly, various embodiments of the present disclosure are generally directed to an apparatus and method for managing data blocks in a data storage device. As explained below, some embodiments provide the data storage device with a controller and a memory module. The controller may be realized as a system on chip (SOC) integrated circuit that provides top level control for data transfers between the memory module and a host device. The memory module includes a non-volatile memory (NVM), which may include rotatable disc memory although other forms of NVM can be used (e.g., solid state, rewritable, erasable, etc.).

In some embodiments, the SOC has an on-chip processing core (CPU) and an on-chip volatile memory. The processing core is configured to generate and store a first level map as a data structure in a memory incorporated into the SOC. The memory is arranged in the form of a first-in-first-out (FIFO) wraparound address lookup table (ALT), also referred to herein as a FIFO buffer. The first level map is arranged as a stack of sequentially received entries that associate logical addresses of user data blocks stored in the on-chip volatile memory with host identification (ID) tags, also referred to as host tags or HTAGs. Each entry is associated with a selected host access (e.g., write or read) command received from the host.

The processing core is further configured to generate and store a second level map as a data structure in the volatile memory that associates the HTAGs with addresses of the volatile memory at which the associated user data blocks are stored. Read and write pointers identify a range of entries which are valid in the first level map in the FIFO buffer.

The processing core searches the active range of the FIFO buffer to determine whether user data blocks associated with a particular host access command are stored in a cache portion of the on-chip volatile memory. If so, the associated HTAG is issued as a look up value to the second level map, which in turn outputs the cache address of the data block(s) in the cache. Should a cache miss be obtained from the FIFO buffer, the processing core routes the host access command to the attached NVM device, as requested data exists in NVM memory.

This scheme provides an efficient cache management system to support high speed data I/O data transfers in accordance with any number of suitable host protocols including PCIe, NVMe, Fibre Channel, Ethernet, etc. External local memory such as volatile DDR DRAM, flash local cache, etc. can be incorporated for use by the SOC, but such external local memory is not required if sufficient on-chip memory is available. The system can process deep FIFO and cache queues (e.g., 4K entries, etc.) using a relatively small on-chip volatile memory such as an on-chip SRAM of 16 megabytes, MB ($10^3$ bytes), 32 MB, etc.

The scheme is NVM capacity independent in that the NVM can be substantially any size while the first and second map structures remain the same size. The map structures can be maintained and/or tuned by the firmware executed by the processing core for optimum performance based on the existing on-chip resources and independently of the overall storage capacity of the NVM.

Once a selected number of entries in the map reaches a predefined threshold, the processing core proceeds to demote data from the cache memory. In the case of cached write data, this may involve issuing a write command and transfer of the cached write data to disc or other NVM. In the case of cached read data, the read data may be marked as stale and made available for overwriting by new data.

In some cases, the SOC may operate as a bridge chip to bridge two (2) separate interfaces, such as a PCIe interface with the host and a SATA interface with the NVM. Any form of NVM can be used including rotatable magnetic recording discs, erasable NAND flash memory, rewriteable semiconductor memory (e.g., STRAM, MRAM, RRAM, PCRAM, XRAM, etc.), hybrid memory structures (e.g., disc and NAND flash), etc.

These and other features and advantages of various embodiments can be understood beginning with a review of FIG. 1 which provides a functional block representation of a data storage device 100. The data storage device 100 includes a controller 102 and a memory module 104. The controller 102 is a control circuit that provides top level control functionality for the storage device, and may be realized in hardware, software and/or firmware. The memory module 104 includes a non-volatile memory (NVM) to provide data storage for a host device.

Figure 2:
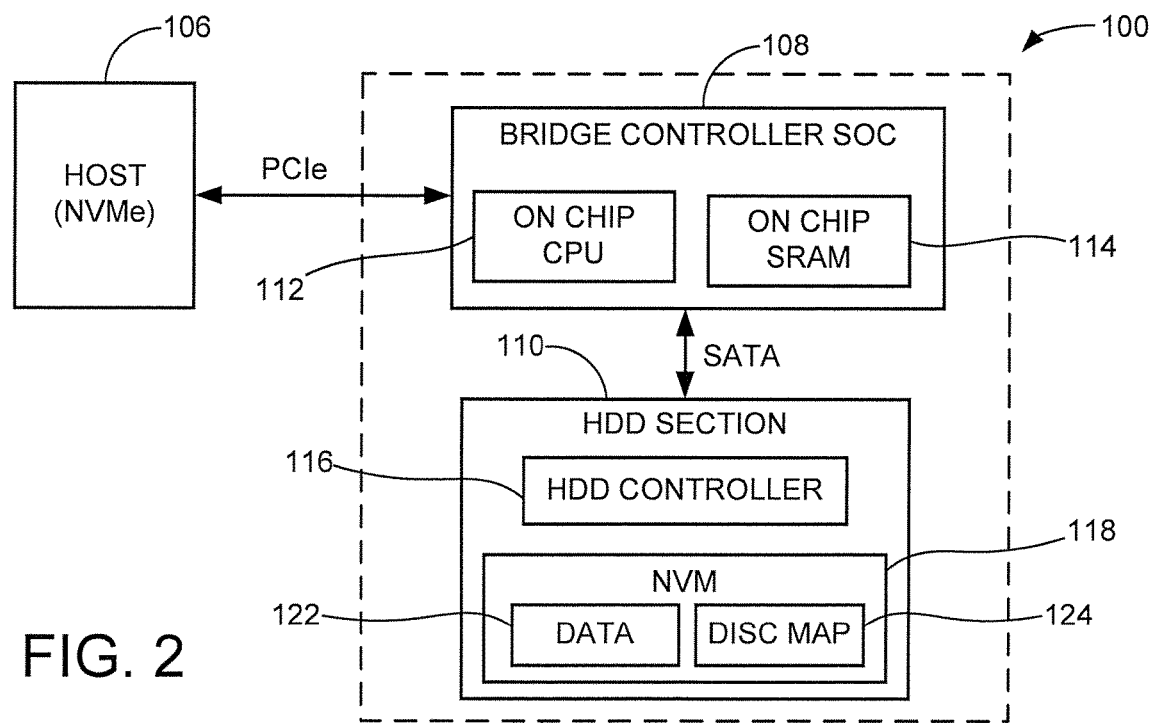
FIG. 2 shows the data storage device of FIG. 1 in greater detail in some embodiments.

FIG. 2 shows the data storage device 100 of FIG. 1 in accordance with some embodiments. The device 100 is characterized as a hard disc drive (HDD) that uses rotatable magnetic recording discs to form the NVM, although this is merely exemplary and not limiting. The device 100 is shown to be operably coupled to an external host device 106 via a suitable host interface, such as PCIe.

The storage device 100 includes a bridge controller system on chip (SOC) integrated circuit 108. The SOC 108 corresponds to the controller 102 in FIG. 1 and provides host access command control to transfer data between the host device 106 and an HDD section 110. The HDD section 110 generally corresponds to the memory module 104 in FIG. 1. The SOC 108 is configured as a bridge chip to facilitate internal SATA interface connections with the HDD section 110, although other configurations can be used. As explained below, the SOC generally facilitates high I/O throughput exchanges with the HDD section.

The SOC 108 includes an on-chip processing core 112. The processing core 112 operates as a processing circuit to process access commands from the host 106. It is contemplated that the processing core 112 is formed of one or more programmable processors (CPUs) that execute programming (firmware) during operation, although the processing core 112 can additionally and/or alternatively be realized using hardware circuits. An on-chip volatile memory 114, realized as SRAM, provides internal volatile memory for use by the processing core 112. At this point it will be recognized that the SOC 108 represents a single integrated circuit device, although such is not necessarily required.

The HDD section 110 includes an HDD controller 116 and an NVM 118. As with the SOC 108, the HDD controller 116 is a control circuit realized as one or more programmable and/or hardware processor circuits. The NVM 118 includes one or more rotatable magnetic recording discs, with user data blocks from the host 108 stored to tracks defined on the various disc surfaces. These user data blocks are generally represented at 122. The NVM also stores various forms of control data 124, including disc map data that provides a logical to physical address translation layer for the HDD controller 116 to locate the data blocks 122 within the NVM.

Figure 3:
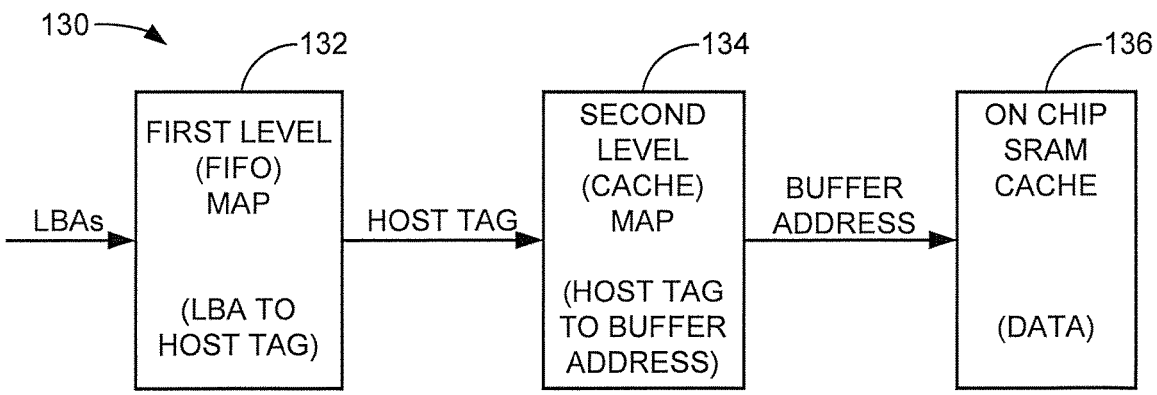
FIG. 3 shows a multi-map data structure used by the data storage device to manage data stored in the system on chip (SOC) volatile memory (SRAM) of FIG. 2.

FIG. 3 shows a data structure 130 utilized by the SOC 108 to manage locally cached user data blocks in the on-chip SRAM 114 of the SOC 108. The data structure 130 includes a first level map 132, a second level map 134, and a data cache or buffer 136. The map data structures can be physically realized in the SRAM 114 or elsewhere within the SOC 108 as required.

The first level map 132, also referred to as a FIFO buffer, provides a number of entries for various access commands received and processed by the host 106. The first level map 132 correlates logical block addresses, or LBAs to host identification (ID) values (also "host tags" or "HTAGs"). Any suitable FIFO depth can be used; in one embodiment, a total of 4K (4096) entries are provided in the first level map.

The second level map 134, also referred to as a cache map, correlates the HTAGs to buffer (cache) addresses for the user data blocks stored in the cache 136. This enables the processing core 112 to locate and operate upon the data as required, such as by returning the data to the host as a read cache hit.

Figure 4:
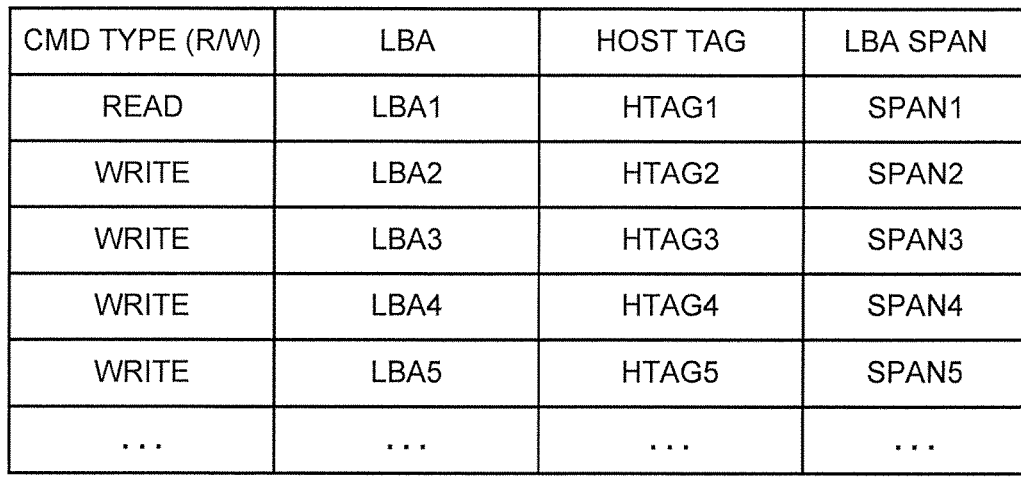
FIG. 4 is an example format for the first level (FIFO) map of FIG. 3 in some embodiments.

FIG. 4 provides a generalized format for the FIFO buffer 132 of FIG. 3 in accordance with some embodiments. The format is merely illustrative and is not limiting, as other formats can be used. The FIFO buffer 132 includes a number of entries (rows) 138. Each entry 138 includes a number of data fields, with each data field having a corresponding number of bits.

A command indicator (flag bit) indicates the type of access command associated with the entry. In this example, write commands and read commands are shown, although other commands may be used. An LBA field indicates a logical address of an initial data block for the associated command. Logical addresses in the form of LBAs are shown, but other forms of logical addressing can be used such as key-values, virtual block addresses (VBAs), etc.

A host tag field provides the assigned HTAG for the corresponding command, and an LBA span field indicates a span of LBAs associated with the command to facilitate multi-block access commands. The HTAGs may be tied to the FIFO lines and reused so that every command that is subsequently written to a given FIFO line reuses the same host tag value. In other cases, new HTAGs continue to be issued up to some predetermined maximum incremented value.

The processing core 112 from FIG. 2 accesses the FIFO buffer in response to receipt of a new host access command, such as a read command. If a match (hit) is obtained between an input LBA from the new host access command and one of the existing LBAs in the active range, the processing core outputs the associated HTAG value for the matching entry. As noted above, present example contemplates a total of 4K slots in the FIFO to accommodate up to a maximum of 4K entries.

It is contemplated that when the data storage device 100 is initialized from a cold start, the FIFO buffer 132 and the cache 136 may begin in an empty or sparsely populated state. These structures will begin to accumulate data as host access commands are received from the host device 106; access command information will be gathered into new entries in the FIFO buffer 132, and the associated read or write data will be accumulated in the cache 136. The FIFO buffer 132 will reflect the order of the commands received from the host. In the case of cache hits on existing data, new entries need not be added to the FIFO sequence since the corresponding entries are already present in the FIFO buffer.

Figure 5:
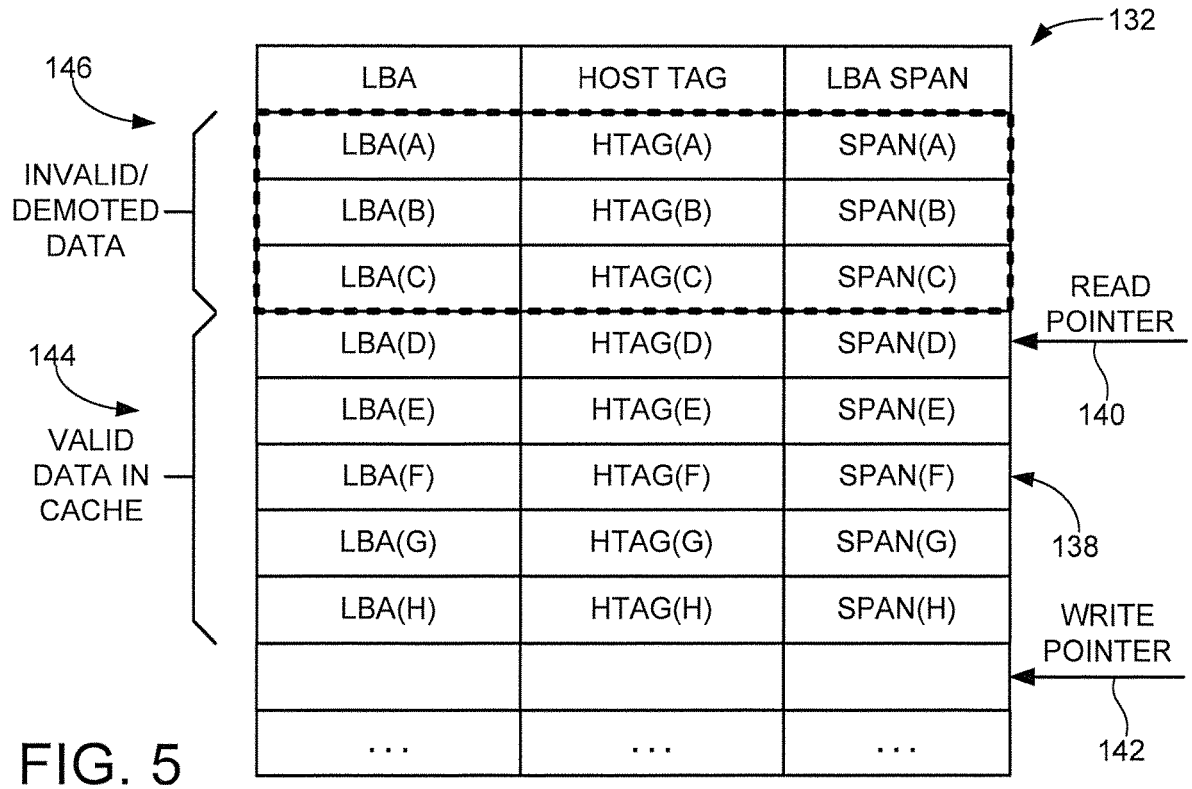
FIG. 5 shows pointer management of the first level map in some embodiments.

FIG. 5 shows the FIFO buffer 132 of FIG. 4 with the command type fields omitted for simplicity of illustration. A valid (active) range of the FIFO buffer 132 is established by respective read and write pointers 140, 142. The valid range is denoted at 144 and represents those entries in the FIFO buffer that still maintain the corresponding user data blocks in the cache 136. The read pointer 140, also referred to as a first pointer, denotes the beginning entry in the FIFO buffer 132 of the valid range. The write pointer 142, also referred to as a second pointer, points to the next entry/slot at the end of the valid range 144.

An invalid (inactive) range is denoted at 146. The invalid range 146 is enclosed via a dark broken line and constitutes entries 138 that are no longer current, so that the associated user data blocks are no longer available in the cache 136. In the case of a write command, an invalid entry indicates that the data have been written to the NVM. In the case of a read command, an invalid entry indicates that the read cached data have been jettisoned from the cache. The space in the cache formerly occupied by the invalid data is made available for new data.

Figure 6:
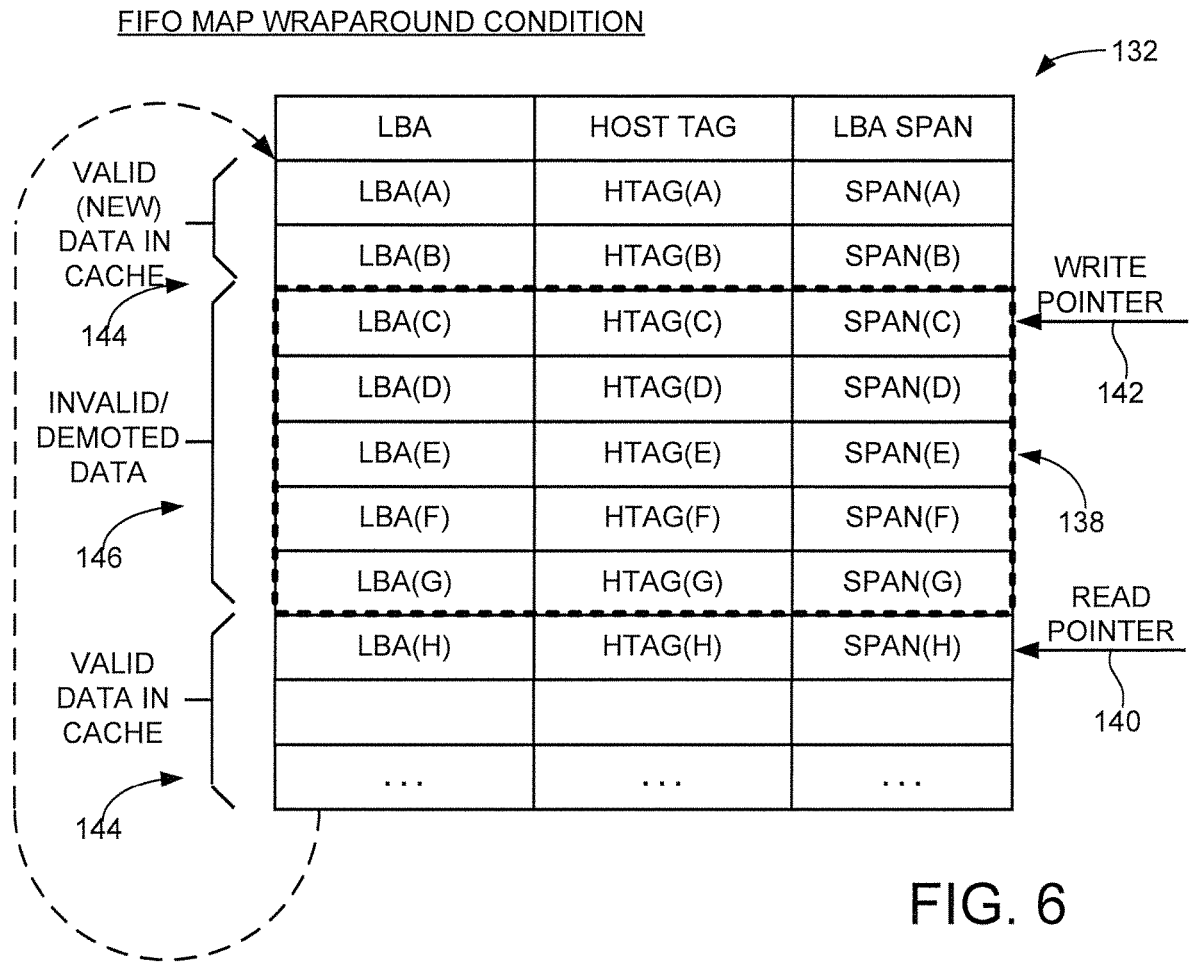
FIG. 6 shows wraparound condition management of the first level map in some embodiments.

FIG. 6 shows the FIFO buffer 132 of FIG. 5 to illustrate a wraparound condition. Once the FIFO buffer has been filled with entries, the sequence returns to the top of the buffer with additional, new entries being overwritten onto the older, previously existing entries. As noted above, the host tags may remain constant and be reused, or new host tag values can be issued as desired. In this latter case, the total number of host commands can be tracked over an extended period of time for statistical analysis purposes. The read and write pointers 140, 142 advance as shown to maintain the desired size for the valid range 144 within predetermined limits.

Figure 7:
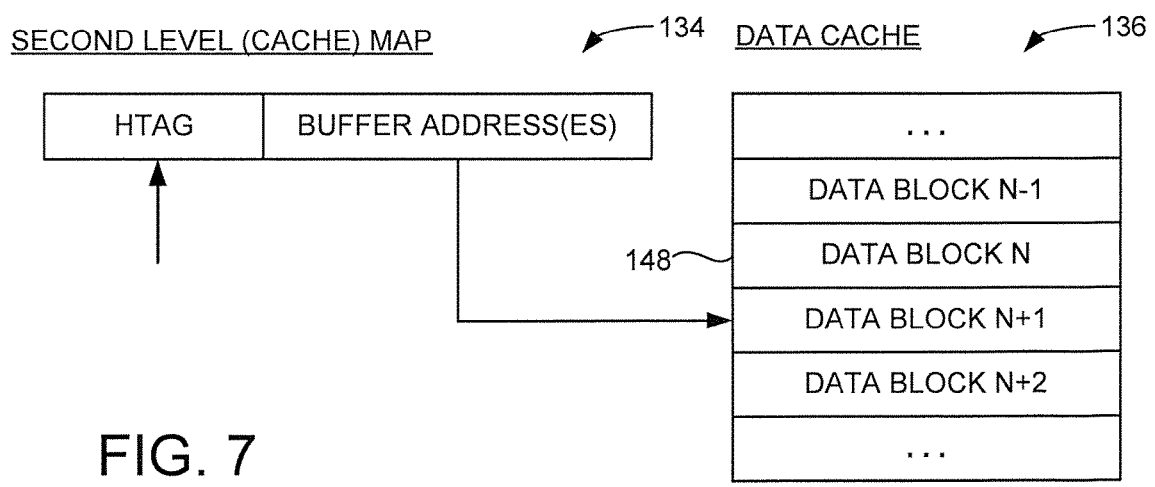
FIG. 7 illustrates an example format for the second level (cache) map in accordance with some embodiments.

FIG. 7 is a simplified representation of the second level (cache) map 134. Once a valid HTAG is obtained from the FIFO map, one or more corresponding buffer addresses are identified from the cache map. This enables the processing core to locate and retrieve one or more associated data blocks 148 from the cache 136.

The second level map 134 will tend to have a relatively small footprint. Using the 4K FIFO example discussed above, 4 MB of cached data with a 1K (1024 bytes) block size could be used to provide 4K buffer addresses to be tracked by the second level map. Other sizes and arrangements could be used.

Figure 8:
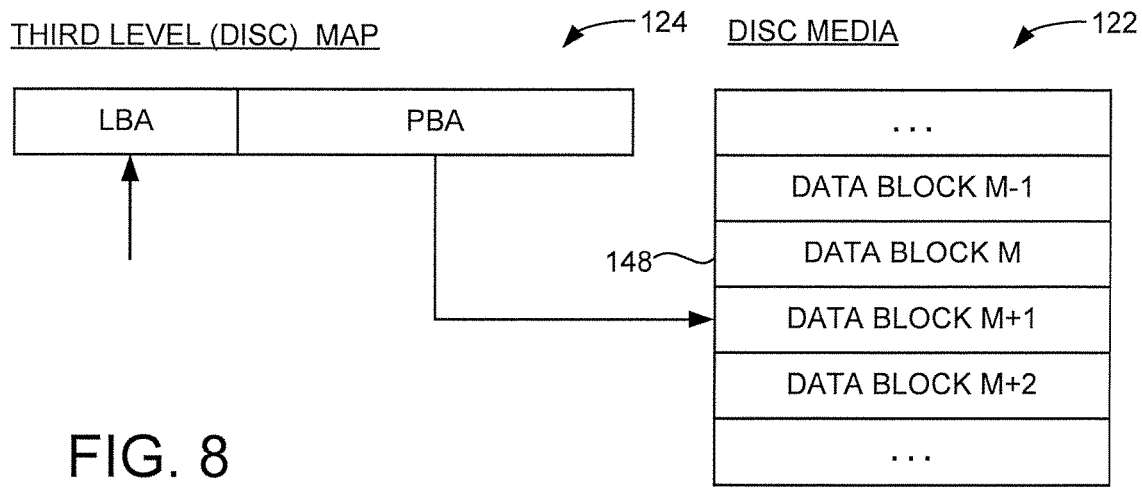
FIG. 8 illustrates an example format for the third level (disc) map in accordance with some embodiments.

FIG. 8 is a simplified representation of the third level (disc) map 124 from FIG. 2. Should a cache miss occur, the processing core 112 forwards the access command to the HDD controller 116 which uses an input LBA value associated with the command to identify a corresponding physical block address (PBA) at which the requested data blocks 148 are stored. The disc PBA can be expressed in any suitable manner including head, zone, track, offset, etc. A seek operation is thereafter scheduled and performed under the direction of the HDD controller to move the associated data transducer (head) adjacent the recording surface to service the host access command.

The format for the third level (disc) map 124 can vary depending on the requirements of a given application. Unlike the first and second level maps 132, 134, the size of the third level map will tend to be a function of the overall storage capacity of the NVM. In the case of rotatable storage where data blocks with the same logical address tend to be overwritten to the same physical location, one or more lookup tables (LUTs) can be arranged as the disc translation layer to provide the system with the physical locations of the blocks.

Erasable memory such as NAND flash generally requires a memory location be subjected to an erasure operation to reset the memory cells before a new set of data can be written to the location. For this reason, a more complex map structure may be required including multi-level map structures with forward pointers and other mechanisms to enable the system to locate the most current version of a given data block. It will be noted at this point that the various embodiments presented herein can be readily integrated for use with a conventional NAND flash map structure, since the first and second level maps 132, 134 enable fast location of cached data in the local data cache 136. If a cache miss is detected, the conventional NAND flash map structure can be consulted and used.

Figure 9:
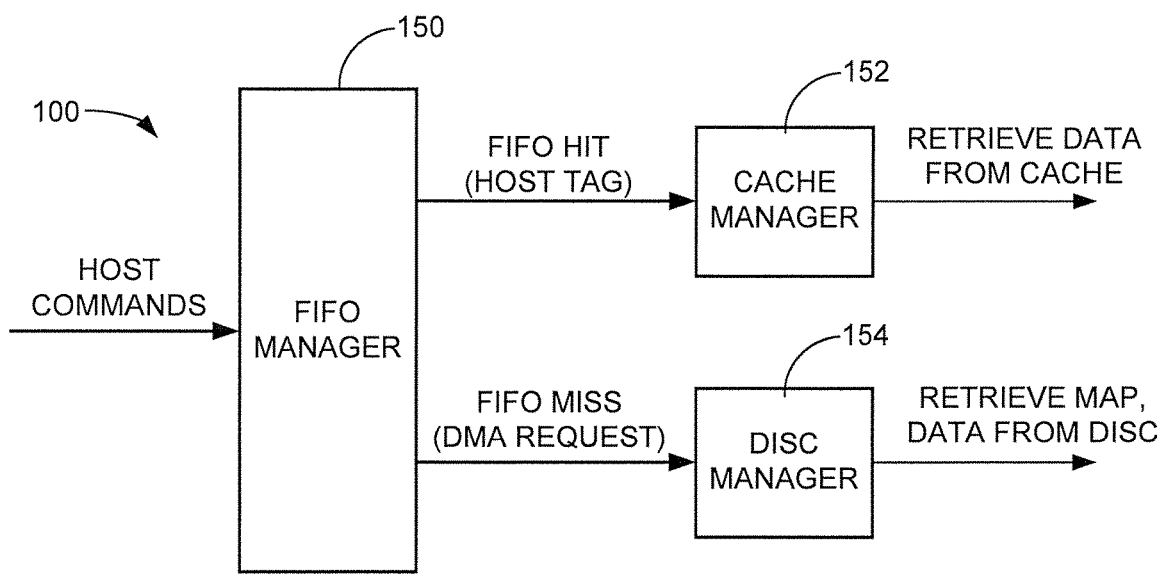
FIG. 9 is a functional block representation of various manager circuits of the SOC of FIG. 2 that use the first, second and third level maps of FIGS. 4-7.

FIG. 9 is a functional block representation of further aspects of the data storage device 100 in some embodiments. FIG. 9 shows a FIFO manager 150, a cache manager 152 and a disc manager 154. The FIFO manager 150 and the cache manager 152 form a portion of the processing core 112, and the disc manager 154 forms a portion of the HDD controller 116 (see FIG. 2).

The FIFO manager 150 manages and searches the FIFO buffer 132. If a FIFO hit is obtained using the first level map, the associated host tag(s) will be provided to the cache manager circuit 152, which uses the second level map to locate and retrieve the associated cached data from the cache 136.

If a FIFO miss occurs, the processing core routes the host access command to the attached HDD or other NVM device containing the disc manager circuit 154, which uses the third level (disc) map to carry out a data transfer operation with the data area 122 of the NVM disc memory 118. In the case of a read command, the requested data will be retrieved from the NVM 118 and stored in the cache 136 pending subsequent transfer to the host 106. A new entry will be appended to the FIFO buffer 132 and the cache map 134 will be updated to correlate the associated HTAG for the new FIFO buffer entry to the cache line(s) that store the retrieved data. The addition of a new entry to the FIFO buffer in this way may trigger the release of a queued command by the FIFO manager 150 to the disc manager 154 to service the next command in the sequence.

Figure 10:
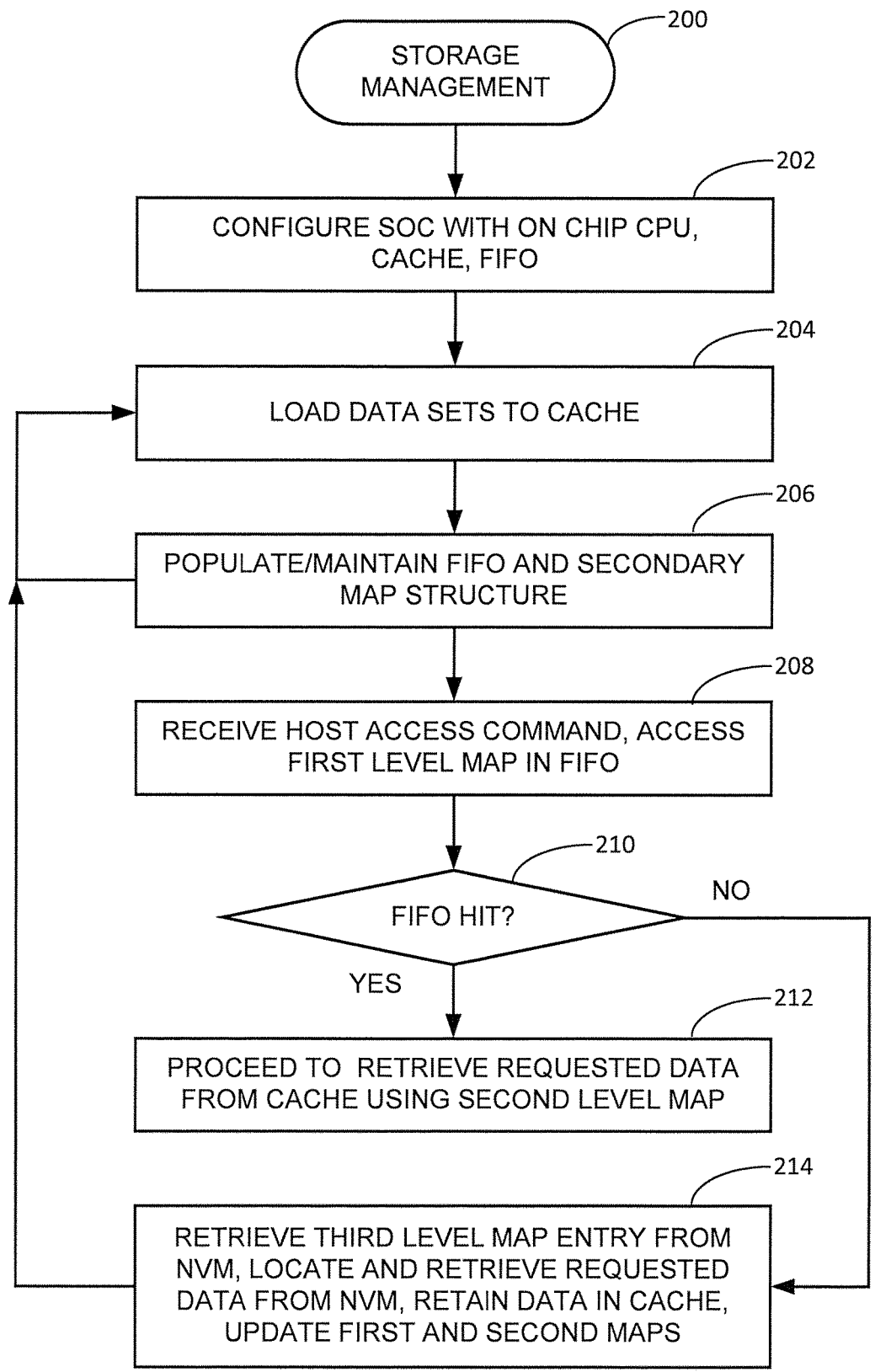
FIG. 10 is a flow chart for a storage management routine illustrative of steps carried out in accordance with various embodiments.

FIG. 10 is a flow chart for a storage management routine 200 to summarize the foregoing discussion. The various steps shown in FIG. 10 can represent programming utilized by the processing core 112 of FIG. 2 during storage device operation. The steps are merely exemplary and can be modified, appended, omitted, performed in a different order, etc. depending upon the requirements of a given application.

As shown by FIG. 10, a data storage device such as 100 is initially configured with a system on chip (SOC) integrated circuit device to serve as the main controller for the storage device. The SOC is provided with one or more on-chip processing cores (CPUs), and one or more local memory locations configured as described above to implement the FIFO buffer 132, cache map 134 and data cache 136. It is contemplated albeit not necessarily required that the local memory is integrated into the SOC.

Normal device operation commences at step 204 to include the loading of data sets (e.g., user data blocks associated with various host access commands) to the cache 136. At step 206, the FIFO buffer 132 is populated with corresponding entries 138 to track the various data sets, and the second level cache map 134 is configured to associate the host tags with the various cache buffer addresses at which the data sets are stored.

As shown by step 208, newly received host access commands are analyzed using the first level (FIFO) map 132 to determine whether a logical address associated with the command is listed within the valid range 144 of the FIFO buffer (decision step 210). If so, the SOC proceeds at step 212 to access the second level (cache) map 134 to retrieve or otherwise process the requested data from the data cache 136. If a cache miss occurs, the routine passes to step 214 where the third level (disc) map 124 is accessed and used to locate and process the data command.

In some embodiments, only read commands are processed by step 208 with a view toward obtaining read cache hits that avoid the need to access the NVM for the requested data. In other embodiments, write commands may be subjected to this processing as well with a view toward identifying older versions of cached write data that may be marked as stale (e.g., replaced by a later, more current version), thus eliminating the need to write the cached stale write data. Status fields can be provided to the FIFO buffer format including a valid/current flag bit, etc. to indicate these and other forms of information for the system.

During the management of the FIFO buffer, the processing core 112 will continually manage the depth of the active range and, as required, jettison commands from the first level map by forwarding such commands to the HDD controller to write data to the NVM 118 or to mark cached read data in the cache 136 as stale.

From this discussion it will be recognized that the cache management system generally operates to service the commands more or less in the order received; that is, the examples described above generally operate to release commands to the HDD controller in an order that generally corresponds to the order in which the commands were received by the storage device. Variations can be utilized as required so that commands can be advanced out of order to the HDD controller such as through the use of additional status or flag bits for individual entries within the valid range of the FIFO buffer for those data sets that have been released. However, since the first and second level maps 132, 134 track the status of the cached data, it is not generally detrimental if, for example, cached write data have already been written to disc by the time that the processing core transitions the entries to an invalid state.

Multiple versions of write data having the same logical address may be supplied to the storage device and entries for both older versions of the data and newer versions of the data may be resident at the same time within the valid range of the FIFO buffer. Normal write/read collision prevention techniques can be used to ensure that older version data are not returned to a requesting host or written to the NVM. Additionally, a full search of the valid range of the FIFO buffer can be carried out during each search. Because the entries are added to the FIFO buffer in order, the lowest entry will constitute the most recent version, and the other versions can be ignored (or marked stale, etc.).

During FIFO search operations of the first level map, the processing core limits a search of the entries in the valid range 144 between the respective pointers. The processing core 112 manages the depth of the valid range 144 to maintain the amount of searched data to some nominal value. As new commands continue to be received by the device 100 and new entries are added to the FIFO buffer 132, the processing core 112 may jettison a corresponding number of the entries to expand the range of inactive entries. In this way, the rate of transitioning of entries from valid to invalid status is generally managed to match or exceed the rate at which new host access commands are received.

Figure 11:
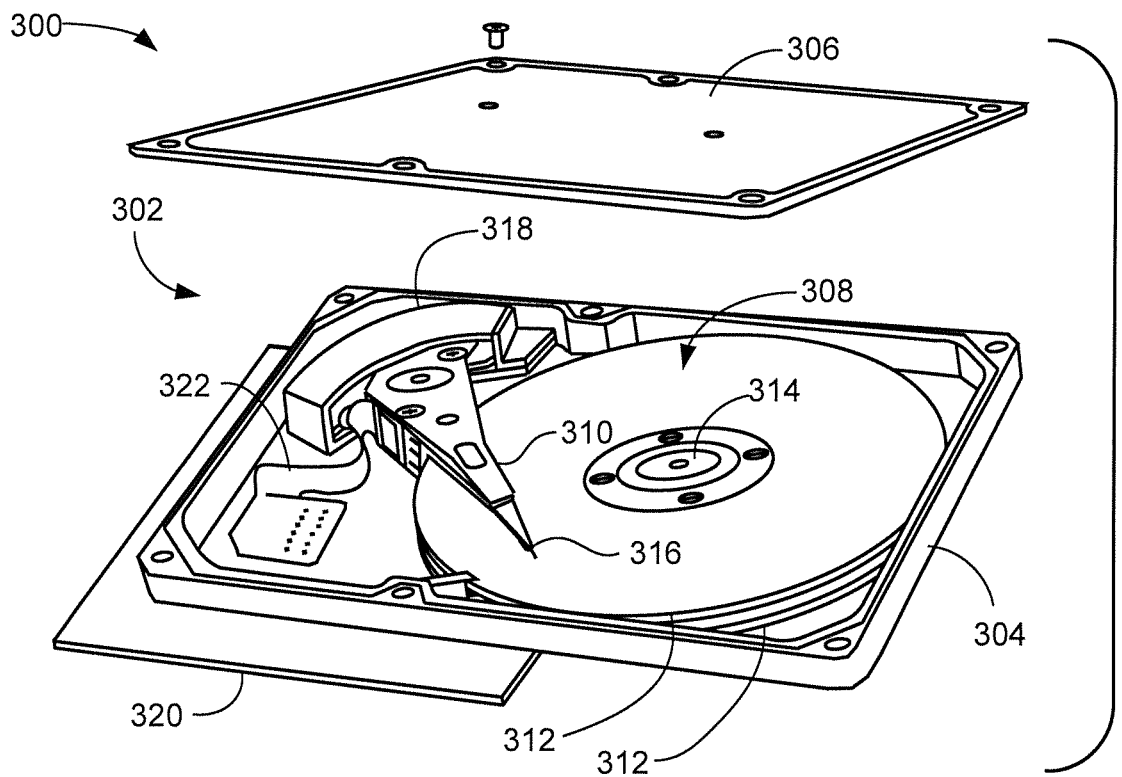
FIG. 11 shows the data storage device of FIG. 1 configured as a hard disc drive (HDD) or hybrid drive in some embodiments.

FIG. 11 provides an exploded representational view of a hard disc drive (HDD) 300 in further embodiments. The HDD 300 represents one version of the data storage device 100 discussed above and is configured to perform data storage management in accordance with the routine of FIG. 10.

The HDD 300 includes an environmentally sealed housing 302 formed of a base deck 304 and top cover 306. Housed within the interior of the housing 302 is a disc stack 308 accessed by a rotary actuator 310. The disc stack includes a number of rotatable magnetic recording discs 312 (in this case, two) that are rotated at a constant high velocity by a spindle motor 314. The actuator 310 supports an array of data read/write transducers (heads) 316 adapted to write data to and read data from sectors arranged along concentric data tracks (not shown).

The actuator 310 is pivoted to advance the transducers 316 radially across the disc surfaces using a voice coil motor (VCM) 318. Control electronics, including circuitry corresponding to the SOC 108 and HDD controller 116 of FIG. 2 are supported on an externally mounted printed circuit board (PCB) 320. A flex circuit assembly 322 includes a bulkhead connector to enable the communication of power and data signals between the interior of the device and the external PCB.

As noted above, the various embodiments disclosed herein are particularly suitable for a data storage device such as the HDD 300 that utilizes rotatable data recording media. Other forms of storage devices, such as hybrid devices that use both rotatable media and solid state media, can also incorporate the various embodiments.

Figure 12:
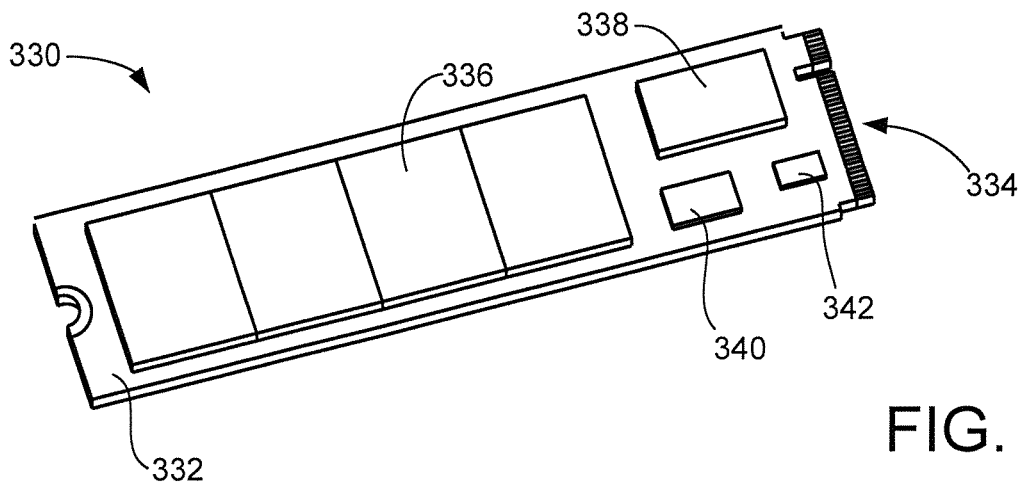
FIG. 12 shows the data storage device of FIG. 1 configured as a solid state drive (SSD) in some embodiments.

Still other forms of storage devices can be used, such as a solid state drive (SSD) 330 shown in FIG. 12. The SSD 330 uses non-volatile solid state semiconductor memory to provide the main NVM space. It is contemplated that the SSD 330 uses NAND flash as the NVM, although other forms of memory can be used including and not limited to NOR flash, EEPROM, STRAM, PCRAM, RRAM, etc.

The SSD 330 includes a base PCB 332 with an edge connector 334. NAND flash memory integrated circuits are denoted at 336, an SOC 338 serves as the top level controller, and additional circuits are represented at 340, 342. From this it can be seen that the cache management techniques disclosed herein are memory agnostic, both as to form of the NVM as well as to the total storage capacity of the NVM.

While local on-chip volatile memory has been disclosed in certain embodiments to implement the FIFO buffer, second level map space and cache space, it will be appreciated that other configurations can be used as required, including non-volatile memory, external memory, etc.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A data storage device, comprising:
    a non-volatile memory (NVM);
    a first level map stored as a data structure in a first memory and arranged as a first-in-first-out (FIFO) buffer to list a plurality of host access commands in an order corresponding to an order in which the host access commands were received from a host device, the FIFO buffer storing a different host tag value for each of the host access commands;
    a cache memory configured to store user data blocks associated with the host access commands listed in the FIFO buffer, each of the user data blocks having a logical address;
    a second level map stored as a data structure in a second memory and arranged as a cache map to correlate cache addresses in the cache memory at which the user data blocks are stored to the host tag values stored in the FIFO buffer, the first memory, the second memory, and the cache memory comprise on-chip local volatile memory that is incorporated into a system on chip (SOC) integrated circuit device; and
    a control circuit configured to, responsive to receipt of a new host access command from the host device, search the FIFO buffer to identify a selected host access command from the plurality of host access commands listed in the FIFO buffer having a logical address that corresponds to a logical address associated with the new host access command, to use the host tag value from the FIFO buffer for the selected host access command as an input value to the second level map to locate a selected cache address in the cache memory, and to transfer a selected user data block stored at the selected cache address to the host device to service the new host access command.

2. The data storage device of claim 1, wherein the control circuit comprises a processing core of the system on chip (SOC) integrated circuit device.

3. The data storage device of claim 2, wherein the processing core comprises at least one programmable processor having associated programming in a processor memory.

4. The data storage device of claim 2, further comprising an NVM controller circuit associated with the NVM, wherein the processing core is further configured to sequentially transfer at least selected ones of the host access commands listed in the FIFO buffer to the NVM controller circuit to transfer at least selected ones of the user data blocks stored in the cache memory to the NVM.

5. The data storage device of claim 2, wherein the processing core is further configured to establish a first pointer that identifies a first selected entry in the FIFO buffer and a second pointer that identifies a second selected entry in the FIFO buffer separated from the first selected entry by a predetermined number of entries to define a valid region, and wherein the processing core limits the searching for the selected host access command from the plurality of host access commands listed in the FIFO buffer having a logical address that corresponds to a logical address associated with the new host access command to the valid region.

6. The data storage device of claim 5, wherein the processing core is further configured to advance the first pointer from the first selected entry in the FIFO buffer to an immediately following entry in the FIFO buffer to adjust the valid region and to forward the host access command listed in the first selected entry to the NVM to transfer a selected number of user data blocks between the NVM and the cache memory.

7. The data storage device of claim 6, wherein the processing core is further configured to advance the second pointer from the second selected entry in the FIFO buffer to a second immediately following entry in the FIFO buffer and to format the second immediately following entry to list the new host access command and a new host tag value.

8. The data storage device of claim 2, wherein the FIFO buffer of the first level map is a wraparound buffer having a total number N entries from a top entry to a bottom entry, and wherein the processing core is configured to, upon the generation of N entries corresponding to N sequentially received host access commands, generate additional entries by overwriting the FIFO buffer beginning with the top entry.

9. The data storage device of claim 1, further comprising a third level map as a data structure stored in the NVM that associates logical addresses of the user data blocks with physical addresses in the NVM at which the user data blocks are stored.

10. The data storage device of claim 2, wherein the processing core is further configured to append a new entry to the FIFO buffer for the new host access command.

11. The data storage device of claim 1, wherein the NVM comprises at least one rotatable magnetic recording disc.

12. The data storage device of claim 1 wherein the NVM comprises solid state semiconductor memory.

13. A method comprising:
    servicing a sequence of host access commands supplied to a data storage device from a host device to transfer user data blocks associated with the host access commands between the host device and a non-volatile memory (NVM);

accumulating the host access commands in a first level map as a data structure in a first memory arranged as a first-in-first-out (FIFO) buffer to list the host access commands in an order corresponding to an order in which the host access commands were received, the FIFO buffer further identifying each of the host access commands by a unique host tag value;

storing user data blocks associated with the host access commands in a cache memory, the first memory, the second memory, and the cache memory comprise on-chip local volatile memory that is incorporated into a system on chip (SOC) integrated circuit device;

generating a second level map as a data structure in a second memory arranged as a cache map to correlate cache addresses in the cache memory at which the user data blocks are stored to the host tag values stored in the FIFO buffer;

searching, responsive to receipt of a new host access command from the host device, the FIFO buffer to identify a selected host access command having a logical address that corresponds to a logical address associated with the new host access command;

using the host tag value for the selected host access command as an input value to the second level map to locate a selected cache address in the cache memory; and transferring a selected user data block stored at the selected cache address to the host device to service the new host access command.

14. The method of claim 13, further comprising appending the FIFO buffer with a new entry corresponding to the new host access command.

15. The method of claim 13, further comprising sequentially transferring at least selected ones of the host access commands listed in the FIFO buffer to an NVM controller circuit to transfer at least selected ones of the user data blocks stored in the cache memory to the NVM.

16. The method of claim 13, further comprising using first and second pointers to identify a valid range of entries in the FIFO buffer for commands having user data blocks stored in the cache memory, wherein remaining entries in the FIFO buffer outside the valid range list invalid commands that do not store user data blocks in the cache memory.

17. The method of claim 13, wherein the FIFO buffer of the first level map is a wraparound buffer having a total number N entries from a top entry to a bottom entry, and wherein the method further comprises generating additional entries overwriting the FIFO buffer beginning with the top entry.

18. The method of claim 13, further comprising storing a third level map as a data structure in the NVM that associates logical addresses of the user data blocks with physical addresses in the NVM at which the user data blocks are stored, and accessing the third level map to service the new host access command.

19. The method of claim 13, wherein the NVM comprises at least at selected one of a rotatable magnetic recording disc or a NAND flash memory.

20. The method of claim 13, wherein the first level map data structure is arranged as a first-in-first-out (FIFO) address lookup table (ALT) and is characterized as a cache management mechanism having an overall size that is independent of the overall data storage capacity of the NVM.

* * * * *